United States Patent
Clodic et al.

(10) Patent No.: US 10,775,103 B2
(45) Date of Patent: *Sep. 15, 2020

(54) CRYOGENIC DISTILLATION COMPRISING VACUUM INSULATION PANEL

(71) Applicant: L'Air Liquide, Societe Anonyme pour l'Etude et l'Exploitation des Procedes Georges Claude, Paris (FR)

(72) Inventors: Denis Clodic, Paris (FR); Fabrice Delcorso, Saclay (FR); Jean-Pierre Tranier, L'Hay-les-Roses (FR); Golo Zick, Fontaine (FR)

(73) Assignee: L'Air Liquide Societe Anonyme Pour L'Etude Et L'Exploitation Des Procedes Georges Claude, Paris (FR)

(*) Notice: Subject to any disclaimer, the term of this patent is extended or adjusted under 35 U.S.C. 154(b) by 123 days.

This patent is subject to a terminal disclaimer.

(21) Appl. No.: 16/193,256

(22) Filed: Nov. 16, 2018

(65) Prior Publication Data

US 2019/0107325 A1   Apr. 11, 2019

Related U.S. Application Data

(63) Continuation of application No. 13/964,627, filed on Aug. 12, 2013, now Pat. No. 10,281,204, which is a
(Continued)

(30) Foreign Application Priority Data

Jun. 27, 2006 (FR) ..................................... 06 52671

(51) Int. Cl.
*F25J 3/00* (2006.01)
*F16L 59/14* (2006.01)
*F25J 3/04* (2006.01)

(52) U.S. Cl.
CPC ............... *F25J 3/00* (2013.01); *F16L 59/141* (2013.01); *F25J 3/04945* (2013.01)

(58) Field of Classification Search
CPC .......... F24F 11/83; F24F 11/84; F24F 3/1405; F24F 3/153
(Continued)

(56) References Cited

U.S. PATENT DOCUMENTS 3,133,422 A   5/1964 Paivanas et al.
3,159,004 A   12/1964 Keith
(Continued)

FOREIGN PATENT DOCUMENTS

EP   1279885   1/2003
FR   2771160 A1   5/1999
(Continued)

OTHER PUBLICATIONS

PCT/EP2007/055980; International Search Report dated Oct. 23, 2007.
(Continued)

*Primary Examiner* — Henry T Crenshaw
(74) *Attorney, Agent, or Firm* — Justin K. Murray

(57) ABSTRACT

A cryogenic installation unit comprises at least one item of equipment to be thermally insulated, a structure for containing the at least one item of equipment, a main insulation contained in the structure and, associated with this main insulation, a secondary insulation of lower thermal conductivity than the main insulation, said secondary insulation consisting of a vacuum insulation panel.

21 Claims, 4 Drawing Sheets

Related U.S. Application Data continuation of application No. 12/303,796, filed as application No. PCT/EP2007/055980 on Jun. 15, 2007, now Pat. No. 8,528,362.

(58) Field of Classification Search
USPC .......................................................... 62/643
See application file for complete search history.

(56) References Cited

U.S. PATENT DOCUMENTS

| | | | |
|---|---|---|---|
| 3,894,372 A | | 7/1975 | Roberts et al. |
| 4,457,449 A | | 7/1984 | Bohlander et al. |
| 4,461,399 A | | 7/1984 | Sattelberg et al. |
| 4,726,974 A | * | 2/1988 | Nowobilski .......... B32B 15/082 |
| | | | 428/69 |
| 5,205,042 A | | 4/1993 | Greter et al. |
| 5,376,424 A | | 12/1994 | Hiroshi Wantanabe |
| 5,445,857 A | | 8/1995 | Nowobiliski |
| 5,850,830 A | * | 12/1998 | Smith .................. F24B 1/1957 |
| | | | 126/552 |
| 5,934,080 A | | 8/1999 | Foley et al. |
| 5,971,198 A | | 10/1999 | Olinger et al. |
| 6,335,074 B1 | | 1/2002 | Gasteyer, III et al. |
| 6,378,331 B1 | | 4/2002 | Vancauwenberghe et al. |
| 6,827,894 B1 | | 12/2004 | Tilton et al. |
| 7,311,216 B2 | | 12/2007 | Donnelley et al. |
| 8,528,362 B2 | | 9/2013 | Clodic et al. |
| 2002/0168496 A1 | | 11/2002 | Morimoto et al. |
| 2003/0110796 A1 | * | 6/2003 | Rampp ................ F25J 3/04412 |
| | | | 62/643 |
| 2004/0031794 A1 | * | 2/2004 | Bucher ................ B65D 90/022 |
| | | | 220/4.01 |

FOREIGN PATENT DOCUMENTS

| | | |
|---|---|---|
| FR | 2803652 A1 | 7/2001 |
| JP | S57-025484 U | 2/1982 |
| JP | S58-119188 U | 8/1983 |
| JP | 59-146222 A | 8/1984 |
| JP | 60-044693 A | 3/1985 |
| JP | 63-187084 A | 8/1988 |
| JP | H01138330 A | 5/1989 |
| JP | 07-243590 A | 9/1995 |
| JP | 11-63808 A | 3/1999 |
| JP | 3038656 B1 | 5/2000 |
| JP | 2000-182478 A | 6/2000 |
| JP | 2001-525528 A | 12/2001 |
| JP | 2005-106127 A | 4/2005 |

OTHER PUBLICATIONS

Hausen, Helmuth; Linde, Hermann, "Tieftemperaturtechnik: Erzeugung sehr tiefer Temperaturen, Gasverflussigung u. Zerlegung von Gasgemischen", ISBN 3-540-13972-9 2. Aufl., Springer-Verlag Berline Heidelberg, New Yourk, Tokyo, 1985.

* cited by examiner

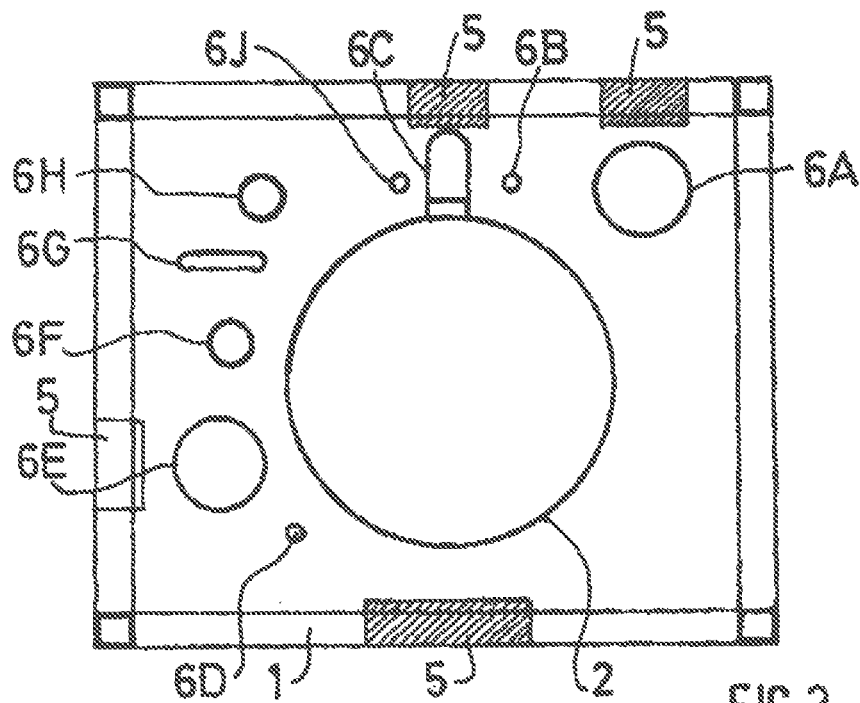
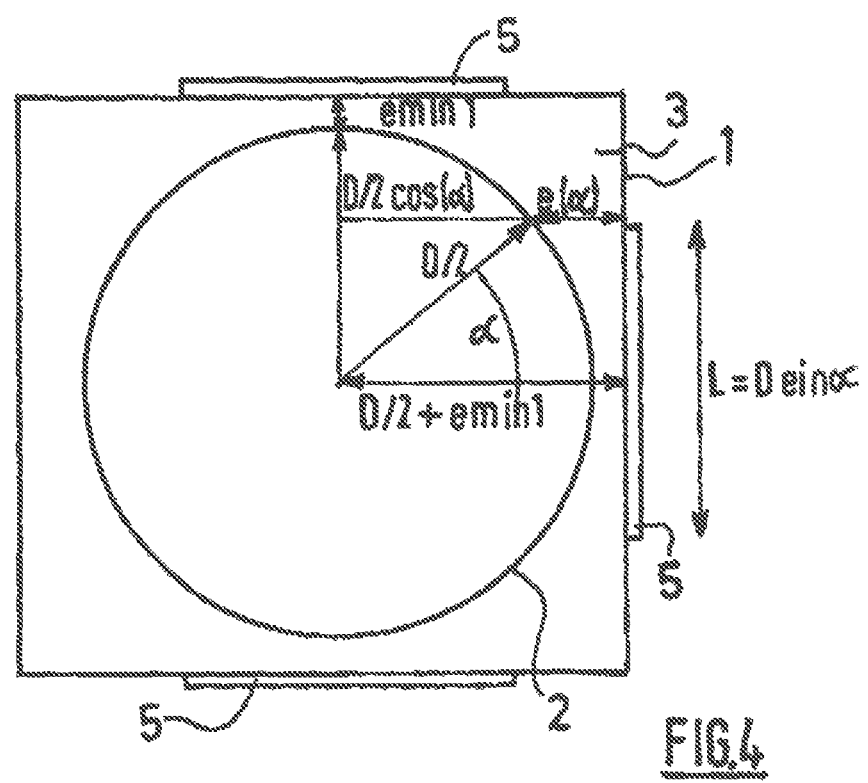

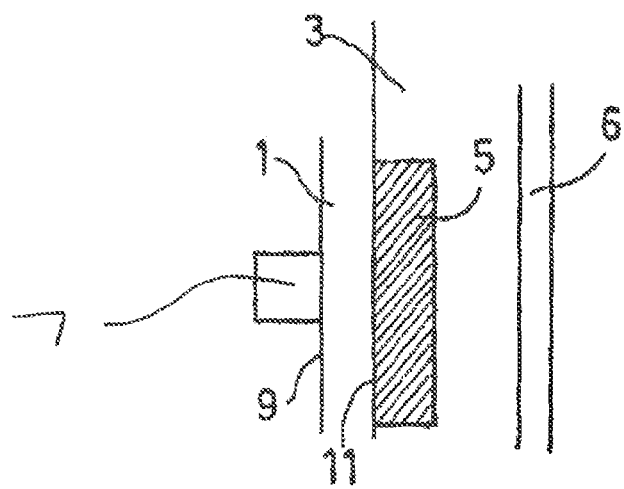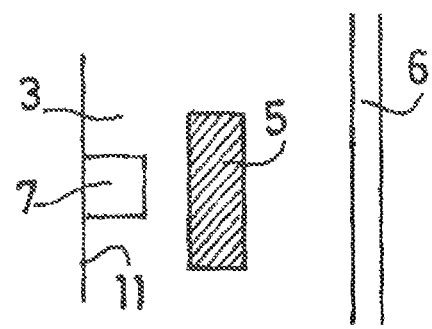
FIG.5  FIG.6
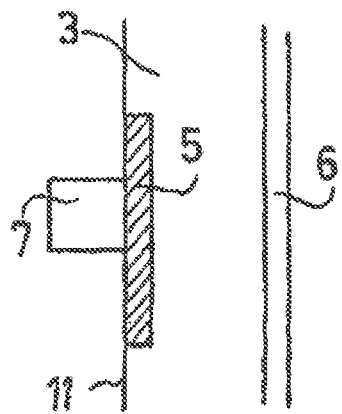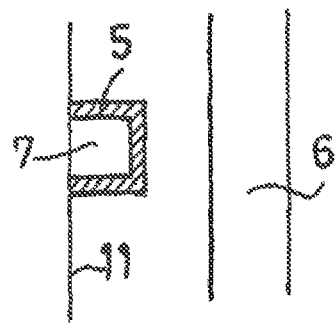
FIG.7  FIG.8

CRYOGENIC DISTILLATION COMPRISING VACUUM INSULATION PANEL

CROSS REFERENCE TO RELATED APPLICATIONS

This application is a continuation of U.S. patent application Ser. No. 13/964,627, filed Aug. 12, 2013, which is a continuation of U.S. Pat. No. 8,528,362, filed Dec. 8, 2008, which is a § 371 of International PCT Application PCT/EP2007/055980, filed Jun. 15, 2007, which claimed the benefit of FR 0652671, filed Jun. 27, 2006, all of which are incorporated by reference herein in their entireties.

FIELD OF THE INVENTION

The object of the invention is to optimize the thermal insulation of equipment, in particular cryogenic equipment, by the use of several insulation technologies on one and the same item(s) of equipment or on one and the same set of equipment.

BACKGROUND OF THE INVENTION

For cryogenic applications, the insulation technology offering at the present time the best compromise is often the cold box, as described in "Tieftemperaturtechnik [*Cryogenics*]", 1985, pages 490-495.

A cold box is a structure (which is generally parallelepipedal) containing the equipment to be insulated and filled with an insulation, generally in powder form (one of the insulations most frequently used in cryogenics is perlite). This insulation generally fills the entire space between the items of equipment and the entire space between the equipment and the structure.

The main functions of the structure are:
to support the insulation; and
to partly support the equipment.

The main functions of the insulation are:
to limit the heat losses between the items of equipment and the outside; and
to limit heat exchange between the items of equipment.

When designing a cold box, the insulation technology chosen is a compromise between several constraints:
safety (compatibility of the insulation with the products to be insulated, etc.) and the environment (toxicity of the insulation, end-of-life recycling, etc.);
the absence or slight presence of frosting, which may accelerate wear of the equipment and pose safety problems;
accessibility to the equipment;
investment cost; and
loss of energy, divided into:
  specified heat loss to the outside
  specified heat exchange between the various items of equipment in the box.

One of the advantages of a cold box is that it insulates a set of equipment overall (within the context of this patent, the term "equipment" includes all items to be insulated, including any pipework) instead of having to insulate the items of equipment one by one, hence making a substantial saving in time and labour as regards investment cost.

Among the drawbacks, the following may be noted:
the need to construct an external structure for supporting and containing the insulation. This structure is particularly bulky and expensive. Its cost is, to a certain extent, proportional to its volume, the latter depending in particular on:
the size of the equipment,
the space required to fit the equipment and the necessary thickness of insulation;
the accessibility of the equipment, which is restricted in operation (in particular when an insulation in powder form is used). This is because, to gain access to an individual item of equipment, it is often necessary to drain off a large amount of insulation.

SUMMARY OF THE INVENTION

The object of the invention is to optimize the thermal insulation of the equipment by keeping the principle of the box but combining several insulation technologies therewith.

The invention therefore consists of a box comprising:
items of equipment to be thermally insulated with respect to the outside and with respect to other items of equipment;
a structure containing the items of equipment and their insulations, the function of which is to support the insulation and partly support the items of equipment;
a main insulation; and
secondary insulations associated with this main insulation.

An insulation is considered to be secondary if its volume is less than that of the main insulation.

These secondary insulations make it possible, by local action, to lessen the drawbacks of the box, while keeping its advantages and by meeting the design constraints.

Thus, the local use of a secondary insulation of lower thermal conductivity than the main insulation makes it possible:
to reduce the space required to fit the equipment;
to reduce the thickness of insulation; and
to reduce the size of the structure for the same heat loss, and therefore to reduce the investment cost.

This secondary insulation must meet the general insulation design constraints.

Thus, the local use of a secondary insulation, which is easier to remove, will allow easier and quicker access to certain items of equipment, for example those requiring frequent maintenance.

According to one aspect, the subject of the invention is a cryogenic distillation installation comprising:
at least one item of equipment to be thermally insulated;
a structure for containing at least one item of equipment;
a main insulation contained in the structure, the main insulation being a solid insulation;
associated with this main insulation, a secondary insulation of lower thermal conductivity than the main insulation,
and characterized in that the second insulation is in the form of at least one vacuum insulation panel.

The vacuum insulation panel is made of an insulating material placed in an impervious case. Before closing the case, the insulation is subjected to a reduced pressure, for creating a vacuum therein.

The materials used comprise glass fibre, perlite, polystyrene, etc.

The closed case may be formed from flat or curved plates.

According to other optional aspects:
the thermal conductivity of the secondary insulation is at least twice as low as that of the main insulation;

at least one item of equipment to be insulated contains, in operation, at least one fluid at a cryogenic temperature;

the main insulation is in powder form, for example perlite powder;

the secondary insulation is displaced over an opening in the outer case;

the secondary insulation is put into place on the equipment to be insulated;

the secondary insulation is placed on the outer and/or inner case of the structure;

the structure is a cold box;

the secondary insulation is incorporated into the outer or inner case of the structure and/or on the equipment, in particular by bonding or colaminating;

the secondary insulation is between the equipment to be insulated and the outer case of the structure;

the equipment to be insulated is at a distance x from the closest point on the structure, which constitutes a first point, and a second point on the structure is separated from the closest equipment to be insulated by a distance nx, n being greater than 5, or even 10, and the space between the second point and the equipment not comprising a vacuum insulation panel;

the secondary insulation is on the outside of the outer case of the structure;

the secondary insulation is located on at least one projecting part of the structure of the cold box, for example on braces, or beams or angle sections;

the secondary insulation is preferably just installed on at least one region of the equipment lying at a distance from the structure below a given threshold and/or on at least one region of the structure lying at a distance from the equipment below a given threshold;

the secondary insulation is installed on all the regions of the equipment lying at a distance from the structure below a given threshold and/or on the entire region of the structure lying at a distance from the equipment below a given threshold;

the entire region of all the equipment lying at a distance from the closest point on the structure below a given threshold and/or on the entire region of the structure lying at a distance on the closest point on the equipment below a given threshold is insulated by means of a secondary insulation;

the equipment is a storage tank, a phase separator, a column, a heat exchanger, pipework, a pump, a valve or a turbine;

the equipment is located in a region inside the structure, one side of this region being closed off by at least one vacuum insulation panel and the region being insulated from the rest of the inside of the structure by a barrier;

the region where the equipment is located contains at least one bag containing insulation in loose form;

the structure contains a cryogenic distillation unit, preferably an air distillation unit;

the secondary insulation is installed on at least one region of a structure which is in an operating state at an average temperature below or above a given threshold and/or which is exposed to sunlight to a greater or lesser extent than the other regions of the structure;

the thickness of the secondary insulation is higher in at least one region of the structure which is, in the operating state, at an average temperature below or above a given threshold and/or is exposed to sunlight to a greater or lesser extent than other regions of the structure; and the secondary insulation consists entirely or partly of non-flammable material.

BRIEF DESCRIPTION OF THE FIGURES

The invention will be described in greater detail with reference to the drawings, FIG. 1 of which represents the prior art, FIGS. 2 to 4 represent, schematically, an installation according to the invention seen in cross section from above, and FIGS. 5 to 9 represent part of an installation according to the invention seen in cross section from the side.

DETAILED DESCRIPTION OF THE INVENTION

Figure 1:
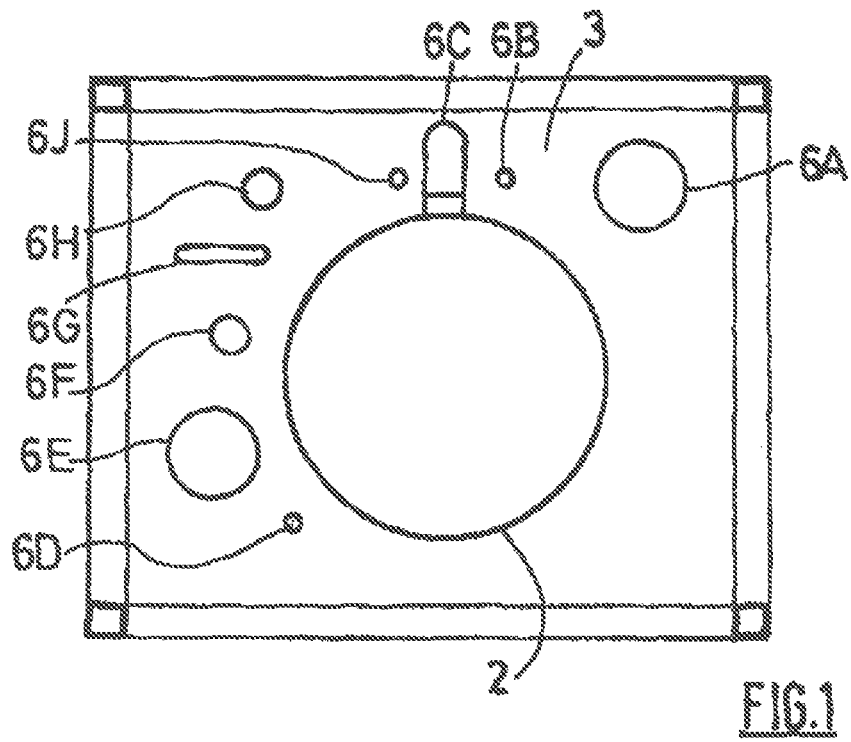

According to the prior art, a "cold box" installation contains the items of equipment operating at the lowest temperatures of an air separation unit, in particular one or more columns, pipework, one or more heat exchangers, including one that may act as subcoolers, possibly at least one turbine and possibly at least one pump. FIG. 1 shows a cuboid structure 1 of square section, containing a column 2, for example air separation double column, and various items of equipment to be insulated, such as turbines, heat exchangers, pipework, etc. . . . 6A to 6J. The structure 1 may alternatively be of circular cross section. The column and the pipework are surrounded with insulation 3, for example perlite.

According to the invention, in FIG. 2, at least some of the items of equipment having part of their surface lying at a distance below a given threshold are covered on at least this part of the surface with a secondary insulation 5 having a lower thermal conductivity than the main insulation 3 that fills the internal space of the structure 1. In particular, it should be noted that part of the surface of the column 2 and part of the surfaces of the various items of equipment to be insulated 6A, 6B and 6E are covered with secondary insulation 5 in the form of a vacuum insulation panel.

It is possible for surfaces positioned at a distance below the threshold not to be covered for cost reasons or if the item of equipment has a low thermal mass or is used only occasionally. The item of equipment 6G is a vertical pipe which has a first right-angle bend so as to pass into the horizontal (and away from the column) and a second right-angle bend in order to continue in the vertical. Alternatively, as may be seen in FIG. 3, the covering may be on the inner case of the structure 1 in those parts of the surface of the latter that are located at a distance below a threshold from an item of equipment contained in the structure 1. Thus, the surfaces of the inner case facing the items of equipment 2, 6A, 6C, 6E and at a distance below a threshold from them are covered with a sheet of secondary insulation 5 in the form of a vacuum insulation panel, having a lower thermal conductivity than the main insulation 3 that fills the internal space of the structure 1.

It is possible for the surfaces positioned at a distance below the threshold not to be covered for cost reasons or if the item of equipment has a low thermal mass or is used only occasionally.

Figure 2:
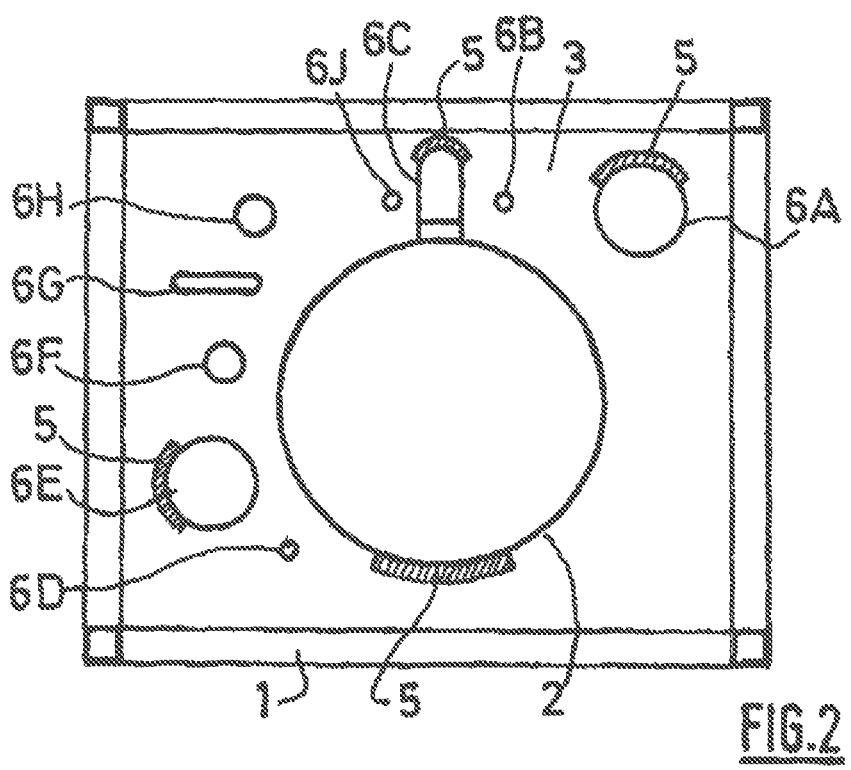

A particular benefit of a secondary insulation of lower thermal conductivity applied locally (as indicated in FIG. 2) in a cold box should be noted, as opposed to, for example, a cryogenic liquid storage tank in which the insulation thicknesses between the cryogenic fluids and the outside are much more constant.

This is because (cf. FIG. 1), in a cold box the insulation thicknesses between the cryogenic fluids and the outside vary greatly. Thus, certain items of equipment are separated from the structure by a large thickness of insulation, whereas others are much closer to the structure and the cryogenic fluids that they contain are practically also as cold.

For a separation unit, there may be components at cryogenic temperature 30 cm from the structure, whereas, for other regions of the structure, the closest component is 1.5 m therefrom. Thus, the ratio of the distance of the closest component from a point on the structure to the distance of the closest component from another point on the structure may range from 1/2 to 1/10.

When storing a cryogenic fluid, the insulation is generally provided by a double-walled jacket filled with insulation, the fluid, at a given temperature, thus being thermally insulated from the outside by an almost constant thickness of insulation. In FIG. 4, the structure 1 of the installation is a box of square external structure. Inside the box, there is a main item of equipment 2 to be insulated, this being cylindrical of diameter D. This item of equipment could be a column, for example an air distillation column or a storage tank, such as a cryogenic liquid storage tank. The minimum insulation distance emin1 determines the size of the structure 1. The space between the equipment and the structure is filled with a main insulation 3, for example perlite. The outer surfaces of the structure 1 at a distance below the threshold $e(\alpha)$ are covered with a secondary insulation 5 in the form of a vacuum insulation panel. Thus, three of the surfaces are partly covered with the insulation 5, whereas the fourth, which is further away, is not.

It is obviously possible to combine the three types of insulation shown in FIGS. 2, 3 and 4 by covering, with secondary insulation 5 in the form of a vacuum insulation panel, at least one item of equipment to be insulated and/or the inside of the structure 1 and/or the outside thereof. It is also conceivable to position the secondary insulation 5 between the item of equipment to be insulated and the structure, said insulation being surrounded by the main insulation 3.

FIG. 4 illustrates the surface of the structure as if it were flat. In fact, the structure is typically made up of sheet metal plates strengthened by vertical posts, horizontal beams and braces placed diagonally, it being possible for these to be inside and/or outside of the structure.

FIG. 5 illustrates an installation comprising a structure 1 having an inner case 11 with a horizontal beam 7 of rectangular cross section on the outside of the case 11, forming a projection. The secondary insulation 5, in the form of a vacuum insulation panel, may be placed in a cylindrical plate on the vertical pipework 6, part of the surface of which lies at a distance below a given threshold from the beam 7. Perlite 3 also insulates the space between the equipment 6 and the case 11.

In FIG. 6, the horizontal beam 7 is located inside the structure and is insulated by perlite 3 and a sheet of secondary insulation 5 in the form of a vacuum insulation panel, interposed between the beam 7 and the equipment 6.

In FIG. 7, a sheet of insulation 5 in the form of a vacuum insulation panel is placed inside the case 11 and the horizontal beam 7 is located outside of the structure. Perlite 3 and a sheet of secondary insulation 5 are interposed between the beam 7 and the equipment 6.

In FIG. 8, the beam 7 is located on the inside of the structure and is insulated by perlite 3 (to be added to the figure) between the beam 7 and equipment 6. However, the beam is also covered with secondary insulation 5 in the form of a vacuum insulation panel over part of its surface located at a distance below a given threshold from the surface of the equipment 6.

The addition of a secondary insulation 5, in the form of a vacuum insulation panel, to the outer wall of the structure 1 makes it possible to reduce emin1 and therefore the cross section of the structure 1.

Let L be the length of the secondary insulation 5 in sheet form that must be added in order to keep the heat losses from the box to the outside constant. L may be estimated in the following manner:

let emin1 be the minimum distance between the main item of equipment 2 and the closest point on the structure 1;

let $emin1_{(main\ insulation)}$ be the minimum distance of the insulation, set by calculation, between the main item of equipment 2 and the closest point on the structure 1 for specified constraints (heat losses with the outside, etc.) when the main insulation is used;

let $emin1_{(secondary\ insulation)}$ be the minimum distance of the insulation, set by calculation, between the main item of equipment 2 and the closest point on the structure 1 for specified constraints (heat losses with the outside, etc.) when the secondary insulation is used;

let D be the diameter of the equipment 2;

let $\alpha$ be the angle shown in FIG. 4 and let $e(\alpha)$ be the distance between the main item of equipment 2 and the structure 1 for a given angle $\alpha$;

if $emin1 = emin1_{(secondary\ insulation)}$ when $e(\alpha) = emin1_{(main\ insulation)}$, then $L = D \sin \alpha$.

The table below gives the reduction in box volume obtained when a secondary insulation 2 to 5 times more effective than the main insulation is used.

| Diameter (D) of the main item of equipment m | Minimum insulation thickness (secondary insulation) m | Alpha ($\alpha$) rad | Minimum insulation thickness (main insulation) m | Application length (L) of the secondary insulation m | Cross section of the box m2 | Reduction in box volume % |
|---|---|---|---|---|---|---|
| 4.00 | 0.50 | 0.00 | 0.50 | 0.00 | 25.00 | Reference |
| 4.00 | 0.20 | 0.55 | 0.50 | 2.11 | 19.36 | 22.56 |
| 4.00 | 0.10 | 0.64 | 0.50 | 2.40 | 17.64 | 29.44 |
| 4.00 | 0.25 | 0.51 | 0.50 | 1.94 | 20.25 | 19.00 |

By applying the secondary insulation 5 over a length L of 2 metres, a 20 to 30% reduction in the volume of structure 1 is obtained.

This calculation is approximate as it does not take into account certain form factors in the case of heat losses, but nevertheless it does show that the use of the secondary insulations is highly advantageous.

Preferably, the secondary insulation 5 takes the form of one or more sheets. Several sheets of standard size may be juxtaposed in order to cover the intended surface.

The secondary insulation 5 is formed by a vacuum insulation panel. In particular, the insulation may be a vacuum insulation panel as described in U.S. Pat. Nos. 4,726,974, 5,445,857, 3,894,372 or 6,335,074. Alternatively, the secondary insulation 5 takes the form of a portion of a cylinder so as to surround part of a cylindrical item of equipment, such as a column, a pipe, a storage tank or a cylindrical structural component (a post, beam or brace). Also alternatively, the secondary insulation 5 may have a U-shape to be placed on a beam, post or brace of square or rectangular cross section.

It is also conceivable to position the secondary insulation 5 according to the exposure to the sun, the south face (in the northern hemisphere) being covered with secondary insulation (or proportionally more secondary insulation 5 than the other faces of the installation). Conversely, to prevent frosting, the thickness of the secondary insulation 5 may be increased on the faces least exposed to sunshine in temperate or cold regions.

It may also be useful to take into account the presence of units close to the installation that operate at high temperature and may thus transfer heat to the installation. The faces of the structure 1 near these units may be covered with insulation 5 in order to allow the installation to be placed closer to other units on the site.

The column 2 may be a single air separation column, an argon column, a mixing column or any other column for separating a gas from air. Likewise, the structure 1 may contain a system of columns and/or several heat exchangers and/or several pipework systems.

Figure 9:
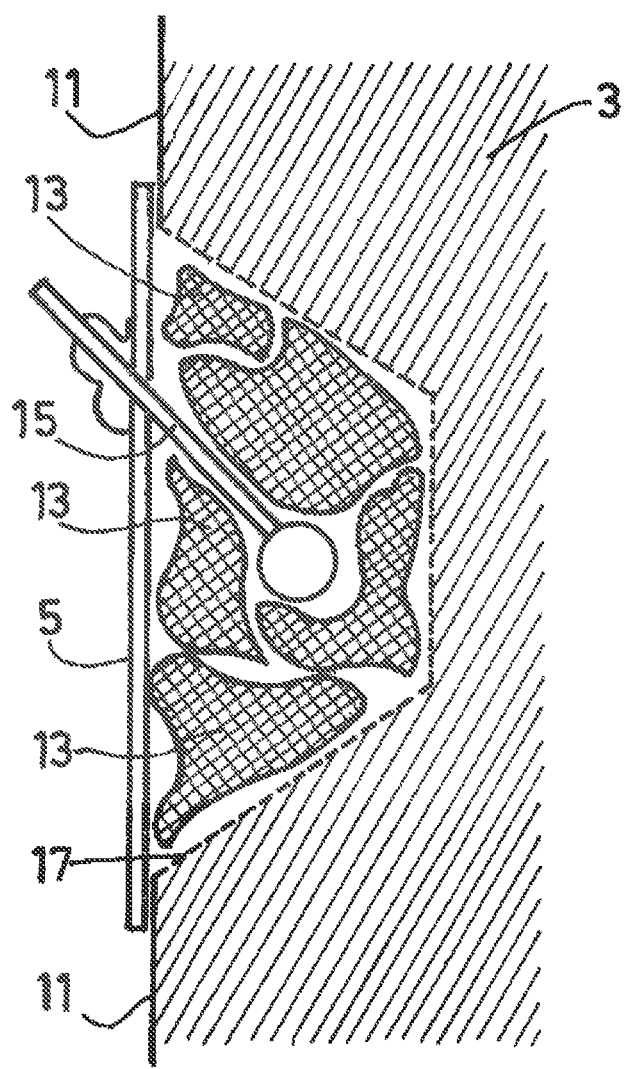

In FIG. 9, a valve 15 is positioned near the wall of the case 11. This case 11 has an opening to allow occasional access to the valve 15. In normal use, this opening is closed and sealed off by a vacuum insulation panel 5 attached to the case 11.

The space around the valve may be filled with bagged insulation 13, for example with glass wool, rock wool or perlite. This filling is not necessarily very dense, but it is advantageous to avoid the formation of thermal loops and icing. The spacing between bags 13 may be filled with purge gas and the main insulation 3 (for example perlite) is supported by a barrier 17, which is preferably not impermeable to the purge gas that may be used with the main insulation (in particular when this is in powder form). The perforations allow the dry purge gas to ventilate the space around the valve 15. This configuration allows rapid access to the valve without having to remove the main insulation (in particular when it is in solid powder form) from the entire cold box down to level with the valve.

The vacuum insulation panels 5 are preferably made of a metal having a very low thermal expansion coefficient, for example Ni-36. The thermal expansion coefficient should not exceed $5 \times 10^{-5}$ m/K.

This invention has been described with regard to an air distillation unit. However, the invention obviously applies to other distillation operations or processes operating at low temperature, especially a unit used for the distillation of hydrogen and carbon monoxide.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value. When such particular value and/or to the other particular value, along with all combinations within said range All references identified herein are each hereby incorporated by reference into this application in their entireties, as well as for the specific information for which each is cited.

What is claimed is:

1. A cryogenic distillation apparatus comprising:
   a structure comprising a ceiling, a floor and a plurality of side walls, wherein the structure is a cold box having a parallelepipedal shape or a circular cross section;
   at least one item of equipment disposed within the structure, the at least one item of equipment selected from the group consisting of a phase separator, a column, a heat exchanger, a pump, a turbine, and combinations thereof, wherein each item of equipment has a side periphery, and the side periphery is made up of a first portion and a second portion, the first portion being the portion of the side periphery that is located at a distance from an outer surface of the closest side wall below a given threshold, the second portion being the remaining portion of the side periphery;
   a main insulation contained in the space between the equipment and the structure, wherein said main insulation comprises a perlite insulation; and
   a secondary insulation having a lower thermal conductivity than the main insulation, wherein said secondary insulation comprises at least one vacuum insulation panel, wherein the secondary insulation is installed such that the secondary insulation is configured to reduce the thermal flux experienced by the first portion of the side periphery of the at least one item of equipment attributable to the outside atmosphere,
wherein the secondary insulation is selectively installed such that there is an absence of the secondary insulation between the second portion of the side periphery of the at least one item of equipment and a point on the outer surface of the structure located closest to the second portion of the side periphery of the at least one of equipment.

2. The apparatus according to claim 1, in which the thermal conductivity of said secondary insulation is one half or less than that of said main insulation.

3. The apparatus according to claim 1, in which said secondary insulation is installed on the first portion of the side periphery of the at least one item of equipment, and wherein there is an absence of secondary insulation installed on the second portion of the side periphery of the equipment to be insulated.

4. The apparatus according to claim 1, in which said structure comprises an outer side case and an inner side case, and wherein said secondary insulation is placed on the outer side case, the inner side case, or both the outer side case and the inner side case of said structure.

5. The apparatus according to claim 4, in which said secondary insulation is incorporated into the outer side case, the inner side case of the structure, or any combination thereof.

6. The apparatus according to claim 4, in which said secondary insulation is located between the first portion of the side periphery of the at least one item of equipment and said outer side case of the structure.

7. The apparatus according to claim 6, in which said equipment to be thermally insulated is at a distance x from the closest point on said structure, which constitutes a first point, and a second point on said structure is separated from the equipment to be thermally insulated by a distance nx, n being greater than 2, and the space between the second point and the equipment comprises an absence of the secondary insulation.

8. The apparatus according to claim 4, in which said secondary insulation is on the outside of said outer side case of the structure.

9. The apparatus according to claim 1, in which the secondary insulation is only installed on the first portion of the side periphery of the at least one item of equipment and/or on at least one region of the structure lying at a distance from the first portion of the side periphery of the at least one item of equipment, such that there is an absence of secondary insulation installed on the second portion of the side periphery of the at least one item of equipment and an absence of secondary insulation installed on a region of the structure that is closest to the second portion of the side periphery of the at least one item of equipment.

10. The apparatus according to claim 1, wherein the secondary insulation is disposed on the equipment to be insulated but is not in contact with the structure, wherein the space between the structure and the secondary insulation is filled by the main insulation.

11. The apparatus according to claim 1, wherein each side wall further comprises an outer side case and an inner side case, wherein the secondary insulation is disposed on the outer side case of the structure, and is not in contact with any equipment, the space between the structure and any equipment being filled by the main insulation.

12. The apparatus according to claim 1, wherein each side wall further comprises an outer side case and an inner side case, wherein the secondary insulation is disposed on the inner side case of the structure, but is not in contact with any equipment, and the space between the secondary insulation and any equipment being filled by the main insulation.

13. The apparatus according to claim 1, wherein the secondary insulation is disposed between the equipment and the structure but is not in contact with either thereof, the space between the secondary insulation and the equipment being filled by the main insulation, and the space between the secondary insulation and structure being filled by the main insulation.

14. An arrangement of insulation within a structure having at least one piece of equipment disposed within an inner volume of the structure and designed to operate at a cryogenic temperature, said arrangement of insulation comprising:
a secondary insulation layer disposed within the structure, wherein the secondary insulation is disposed between the at least one piece of equipment and the structure, the secondary insulation layer having a thermal conductivity lower than that of a bulk insulation;
the bulk insulation filling a remaining inner volume of the structure; and
a first exterior region of the at least one piece of equipment located opposite to a sidewall of the structure and situated closer to the sidewall of the structure than remaining exterior regions of the at least one piece of equipment,
wherein the secondary insulation layer is situated only between the first exterior region of the at least one piece of equipment and an opposite structure wall region formed by part of the sidewall, located opposite to the first exterior region, and sized to only insulate the first exterior region of the at least one piece of equipment from heat leakage from the opposite structure wall region to the first exterior region of the at least one piece of equipment.

15. The arrangement of insulation of claim 14, wherein the secondary insulation layer is a vacuum insulated panel.

16. The arrangement of insulation of claim 14, wherein the secondary insulation layer is located on an outer surface of the at least one piece of equipment.

17. The arrangement of insulation of claim 14, wherein the secondary insulation layer is disposed over an opening in the sidewall of the structure.

18. The arrangement of insulation of claim 14, wherein:
the structure and the at least one piece of equipment is of cylindrical configuration;
the at least one piece of equipment is not centered within the structure so that the first exterior region of the at least one piece of equipment is an outer segment of an outer cylindrical surface of the at least one piece of equipment and the opposite wall region is an inner segment of an inner cylindrical surface of the sidewall of the structure.

19. The arrangement of insulation of claim 18, wherein the secondary insulation layer covers the outer segment of the outer cylindrical surface of the at least one piece of equipment.

20. The arrangement of insulation of claim 18, wherein the secondary insulation layer covers an outer segment of an outer cylindrical surface of the sidewall of the structure.

21. The arrangement of insulation of claim 14, wherein the structure is a cold box having a parallelepipedal shape or a circular cross section.

* * * * *